(12) United States Patent
Basiri et al.

(10) Patent No.: US 9,308,861 B2
(45) Date of Patent: Apr. 12, 2016

(54) VEHICLE DASH SWITCH MODULE WITH HAPTIC AND VISUAL INDICATION

(71) Applicant: Bendix Commercial Vehicle Systems LLC, Elyria, OH (US)

(72) Inventors: Mohammad Basiri, Cleveland, OH (US); David J. Taneyhill, Elyria, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 95 days.

(21) Appl. No.: 14/209,554

(22) Filed: Mar. 13, 2014

(65) Prior Publication Data

US 2015/0258934 A1 Sep. 17, 2015

(51) Int. Cl.
*G08B 21/00* (2006.01)
*B60Q 9/00* (2006.01)
*B60Q 3/02* (2006.01)

(52) U.S. Cl.
CPC .............. *B60Q 9/00* (2013.01); *B60Q 3/0293* (2013.01)

(58) Field of Classification Search
CPC ....................................................... B60Q 9/00
USPC ......... 340/407.1, 407.2, 453, 815.45, 815.69; 200/310, 314
See application file for complete search history.

(56) References Cited

U.S. PATENT DOCUMENTS

| | | | |
|---|---|---|---|
| 4,550,953 A | 11/1985 | Bartholomew | |
| 5,365,791 A | 11/1994 | Padula et al. | |
| 5,439,275 A | 8/1995 | Padula et al. | |
| 6,663,195 B1 | 12/2003 | Arnold | |
| 6,812,833 B2 | 11/2004 | Rothkop et al. | |
| 7,396,089 B2 | 7/2008 | Bennett et al. | |
| 7,414,520 B2 | 8/2008 | Meissner | |
| 7,679,491 B2 | 3/2010 | Costello et al. | |
| 8,136,893 B2 | 3/2012 | Herbst | |
| 8,579,384 B2 | 11/2013 | Bennett | |
| 2006/0197374 A1 | 9/2006 | Jez | |
| 2008/0000763 A1* | 1/2008 | Cove | 200/314 |
| 2009/0091432 A1 | 4/2009 | Koser et al. | |
| 2010/0250071 A1* | 9/2010 | Pala et al. | 701/48 |
| 2013/0162417 A1* | 6/2013 | Chu | 340/407.2 |
| 2014/0041973 A1 | 2/2014 | Zula et al. | |

OTHER PUBLICATIONS

Bendix MV-3 Dash Control Module, Bendix Service Data Sheet, SD-03-3415, BW1613, Mar. 2004.

* cited by examiner

*Primary Examiner* — Jeffery Hofsass
(74) *Attorney, Agent, or Firm* — Brian E Kondas; Cheryl L Greenly; Eugene E. Clair

(57) ABSTRACT

A dash switch module includes an operator interface device, a haptic feedback device associated with the operator interface device, and a visual feedback device associated with the operator interface device. The haptic feedback device provides a first haptic feedback if an operator's intended action is achieved via the operator interface device. The visual feedback device provides a first visual feedback if the operator's intended action is achieved via the operator interface device.

24 Claims, 2 Drawing Sheets

VEHICLE DASH SWITCH MODULE WITH HAPTIC AND VISUAL INDICATION

BACKGROUND

The present invention relates to a vehicle parking system. It finds particular application in conjunction with providing feedback to a vehicle operator regarding a status of the parking system and will be described with particular reference thereto. It will be appreciated, however, that the invention is also amenable to other applications.

Conventional heavy-duty vehicle air brake systems typically use mechanical pneumatic push-pull control valves to control a vehicle's parking brakes. These pneumatic push-pull valves are usually placed within the vehicle's instrument panel, as are the pneumatic lines and connectors used to connect the brake control valves to the other components of the vehicle's air brake system. Dash mounting of these components may consume critical space in the vehicle's dash which may ultimately result in configurations that are detrimental to the driver's comfort and convenience. Furthermore, installation of pneumatics into the dash requires complex, airtight connections during the final assembly phase of the vehicle. Thus, systems including an electrical switch assembly mounted on or in the dash for controlling the parking brakes with an electrically responsive valve located remotely from the dash components have been developed.

There is at least one difference between such electrical switch assemblies and conventional mechanical pneumatic push-pull control valves in the dash instrument panel. More specifically, electrical switch assemblies mounted on or in the dash instrument panel provide relatively less feedback to a vehicle operator than similarly mounted conventional mechanical pneumatic push-pull control valves. For example, conventional mechanical pneumatic push-pull control valves mounted on or in the dash instrument panel typically provide mechanical feedback to the vehicle operator to indicate a status, or change in status, of the vehicle park system. In one conventional system, pneumatic pressure causes a control valve to "pop out" and, possibly, even forcibly hit the vehicle operator's hand when the vehicle operator pulls the control valve to an extended position to change a state of the vehicle parking brakes. This mechanical feedback provides a confirmation to the vehicle operator that the status of the vehicle park system is changed.

The present invention provides a new and improved apparatus and method which addresses the above-referenced problems.

SUMMARY

In one embodiment, a dash switch module includes an operator interface device, a haptic feedback device associated with the operator interface device, and a visual feedback device associated with the operator interface device. The haptic feedback device provides a first haptic feedback if an operator's intended action is achieved via the operator interface device. The visual feedback device provides a first visual feedback if the operator's intended action is achieved via the operator interface device.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
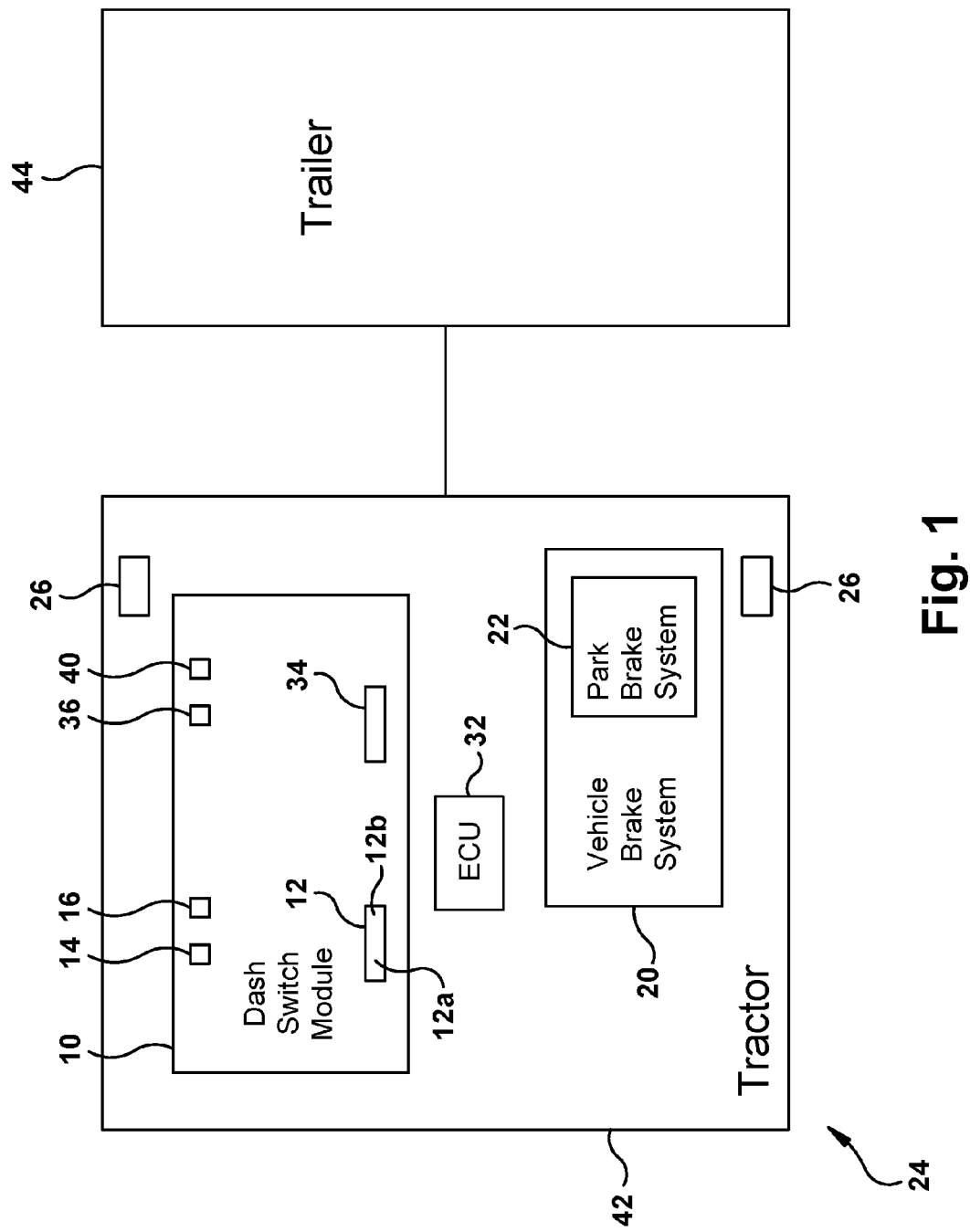
FIG. 1 illustrates a schematic component representation of a vehicle including a dash switch module providing feedback in accordance with one embodiment of an apparatus illustrating principles of the present invention.

With reference to FIG. 1, a simplified component diagram of an exemplary dash switch module 10 is illustrated in accordance with one embodiment of the present invention. The dash switch module 10 includes an operator interface device 12, a haptic feedback device 14, and a visual feedback device 16. The visual feedback device 16 can be part of the operator interface device 12 or separate.

It is contemplated that the operator interface device 12 is a switch. For example, the operator interface device 12 may be a "rocker" switch having three (3) positions. The rocker switch 12 is typically in a neutral (e.g., first) position. From the neutral (first) position, the rocker switch 12 is may be moved to an engage park brake position (e.g., a second position), by depressing a first end 12a, and a disengage park brake position (e.g., a third position) by depressing a second end 12b. Once either the first end 12a or the second end 12b is released, the rocker switch 12 returns to the neutral (first) position.

Alternatively, the operator interface device 12 is a button that, for example, is pulled to an engage park position or pushed to a disengage park position.

It is contemplated that the operator interface device 12 electronically communicates with a vehicle braking system 20 and, in one embodiment, is part of a vehicle parking brake system 22 of an associated vehicle 24. When it is desired to change a state of parking brakes 26 of the vehicle 24, the operator interface device 12 is operated (e.g., moved) by an operator of the vehicle 24. For example, if it is an intent of the vehicle operator to engage the parking brakes 26 of the vehicle 24, the vehicle operator moves the operator interface device 12 to the engage park brake position (e.g., by depressing the first end 12a). Alternatively, if it is an intent of the vehicle operator to disengage the parking brakes 26 of the vehicle 24, the vehicle operator moves the operator interface device 12 to the disengage park brake position (e.g., by depressing the second end 12b).

In one embodiment, the haptic feedback device 14 and the visual feedback device 16 of the operator interface device 12 provide feedback based on whether an intended action of the vehicle operator is achieved. More specifically, the intended action of the vehicle operator is determined based on activation of the operator interface device 12. For example, as discussed above, if the operator interface device 12 is a rocker switch, the intended action of the vehicle operator is determined by whether the first end 12a or the second end 12b of the operator interface device 12 (rocker switch) is depressed. Alternatively, for example, if the operator interface device 12 is a button, the intended action of the vehicle operator is determined by whether the operator interface device 12 (button) is pulled to the engage park position or pushed to the disengage park position.

The haptic feedback device 14 may provide at least a first haptic feedback and a second haptic feedback. The first haptic feedback is a vibration associated with the operator interface device 12 according to a first vibration pattern. The second haptic feedback is a vibration associated with the operator interface device 12 according to a second vibration pattern.

In one embodiment, the first vibration pattern is a continuous vibration for a first predetermined time. The first predetermined time may be a function of the length of time the vehicle operator activates the operator interface device 12. For example, the first predetermined time may begin when the vehicle operator activates the operator interface device 12 to change a state of the vehicle park brake, and the first predetermined time may end a second predetermined time after the change of state of the vehicle park brake is achieved and/or after the operator no longer activates the operator interface device 12. In one embodiment, the second predetermined time may be between about zero (0) seconds to about five (5) seconds after the change of state of the vehicle park brake is achieved and/or after the operator no longer activates the operator interface device 12. However, other time ranges for the second predetermined time are also contemplated.

In one embodiment, the second vibration pattern is a continuous vibration for the first predetermined time. In this case, the second vibration pattern may be an alternate vibration for the first predetermined time.

The visual feedback device 16 may provide at least a first visual feedback and a second visual feedback. The first visual feedback is a light, which is associated with the operator interface device 12, that is illuminated according to a first visual pattern. The second visual feedback is a light, which is associated with the operator interface device 12, that is illuminated according to a second visual pattern.

In one embodiment, the first visual pattern is a continuous light for the first predetermined time. The second vibration pattern may be a blinking light (or no light) for the first predetermined time.

If the vehicle operator's intended change is successful (e.g., if the state of the vehicle parking brakes is successfully changed), which may be referred to as a "good" park (or unpark, in the case of disengaging the park brakes), the haptic feedback device 14 provides the first haptic feedback via the operator interface device 12 and/or the visual feedback device 16 provides the first visual feedback via the operator interface device 12. On the other hand, if the vehicle operator's intended change is not successful (e.g., if the state of the vehicle parking brakes is successfully not changed), which may be referred to as a "bad" park (or unpark, in the case of disengaging the park brakes), the haptic feedback device 14 provides the second haptic feedback via the operator interface device 12 and/or the visual feedback device 16 provides the second visual feedback via the operator interface device 12.

If the vehicle operator's intention is to change the state of the vehicle parking brakes from a disengaged status to an engaged status (or vice versa), one reason the vehicle operator's intended change may not be successful may result from a diagnostic trouble code generated by an electronic control unit (ECU) 32 on the vehicle 24. In one embodiment, the ECU 32 is a brake system ECU that monitors various vehicle functions. For example, it is contemplated that the ECU 32 monitors at least one of an interlock condition (e.g., a foot brake interlock, a bus door interlock, etc.), system faults, whether system pressure is below a predetermined system pressure threshold, whether a valve is degraded and/or unresponsive, whether an electrical system is experiencing a voltage below a predetermined voltage threshold and/or an electrical connection fault, whether the operator interface device 12 is not activated by the vehicle operator for at least a predetermined minimum activation period of time, whether the operator interface device 12 is activated by the vehicle operator for longer than a predetermined maximum activation period of time, and whether the vehicle 24 is moving above a predetermined threshold speed. If the vehicle 24 is moving above the predetermined threshold speed, the ECU 32 may temporarily attempt service brake intervention until the vehicle speed drops below the predetermined threshold speed.

It is contemplated that the haptic feedback device 14 receives a control signal from the ECU 32 based on whether the operator's intended action is achieved. The control signal controls whether the haptic feedback device 14 provides the first haptic feedback or the second haptic feedback. The visual feedback device 16 receives the control signal from the associated ECU 32 based on whether the operator's intended action is achieved. The control signal controls whether the visual feedback device 16 provides the first visual feedback or the second visual feedback. It is contemplated that the ECU 32 may provide different classifications of feedback for the haptic feedback device 14 and the visual feedback device 16. For example, one classification of feedback could be for non-critical notifications (e.g., temporary notifications) that are not related to vehicle safety. Another classification of feedback could be for critical notifications (e.g., permanent notifications) that are related to vehicle safety. For example, non-critical notifications (e.g., temporary notifications) that are not related to vehicle safety may be associated with a low air pressure in the brake system, which may be corrected over time once the vehicle compressor engages. On the other hand, critical notifications (e.g., permanent notifications) that are related to vehicle safety may be associated with a voltage fault, which may be viewed as a permanent fault.

The first haptic feedback causes the vibration of the haptic feedback device 14, which is part of the operator interface device 12, to persist for a first haptic predetermined time period. The first visual feedback causes the light of the visual feedback device 16, which is part of the operator interface device 12, to one of illuminate and blink for a first visual predetermined time period.

In one embodiment, the dash switch module 10 also includes a trailer operator interface device 34, a trailer haptic feedback device 36, and a trailer visual feedback device 40. In this embodiment, the operator interface device 12 is associated with the parking brakes on a tractor 42 of the vehicle 24, and the trailer operator interface device 34 is associated with parking brakes on a trailer 44 of the vehicle 24.

Like the operator interface device 12 described above, the trailer operator interface device 34 is contemplated to be a switch or button. Also, like the haptic feedback device 14 and the visual feedback device 16 of the operator interface device 12 described above, the trailer haptic feedback device 36, and the trailer visual feedback device 40 provide feedback based on whether an intended action of the vehicle operator is achieved for the trailer brake system (e.g., the trailer park brake).

It is to be understood that the haptic feedback device 14 and the trailer haptic feedback device 36 act as means for providing the first haptic feedback if the operator's intended action is achieved via the operator interface device 12 and/or the trailer operator interface device 34. Similarly, the haptic feedback device 14 and the trailer haptic feedback device 36 act as means for providing the second haptic feedback if the operator's intended action is not achieved via the operator interface device 12 and/or the trailer operator interface device 34. The visual feedback device 16 and the trailer visual feedback device 40 act as means for providing the first visual feedback if the operator's intended action is achieved via the operator interface device 12 and/or the trailer operator interface device 34. Similarly, visual feedback device 16 and the trailer visual feedback device 40 act as means for providing the second visual feedback if the operator's intended action is not achieved via the operator interface device 12 and/or the trailer operator interface device 34.

Figure 2:
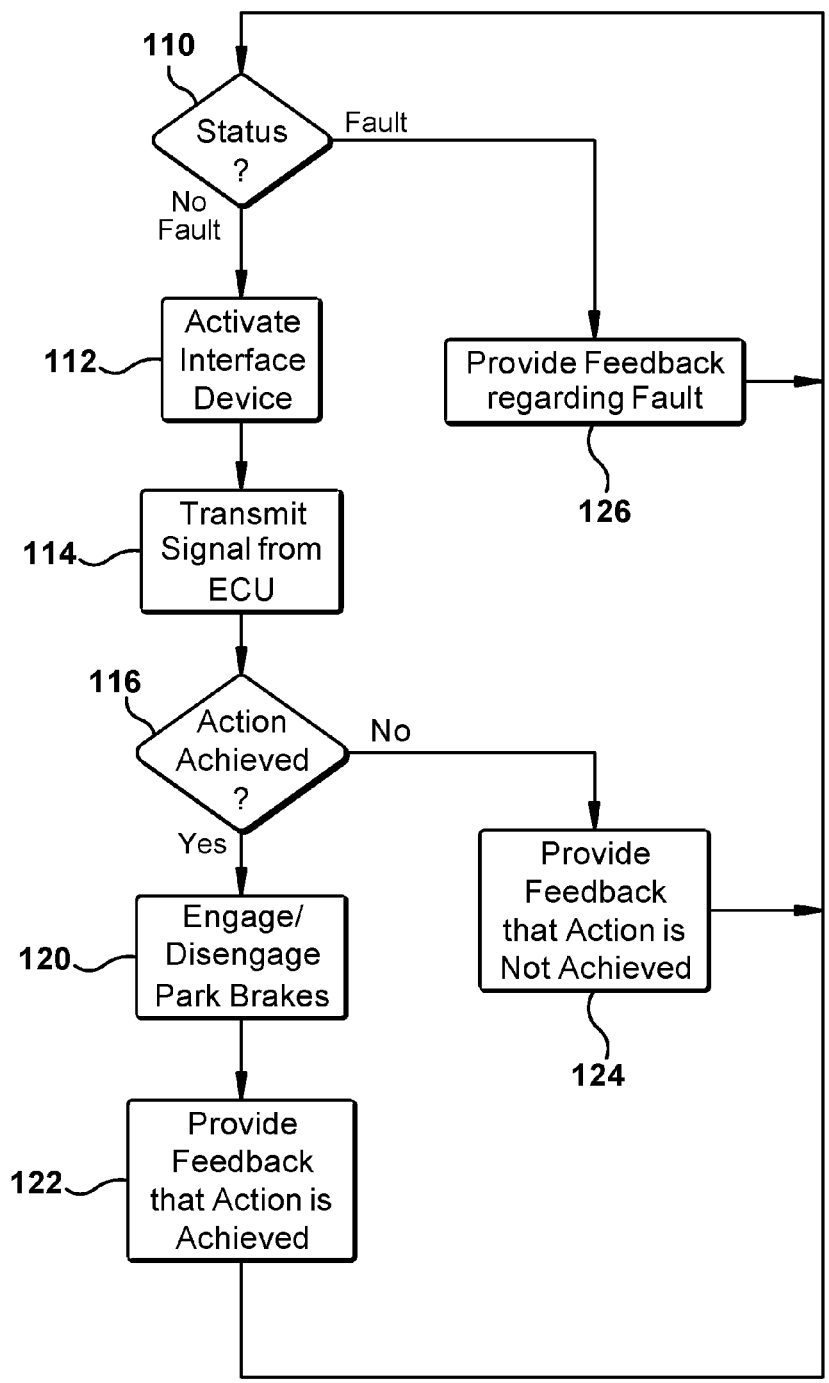
FIG. 2 is an exemplary methodology of providing feedback associated with the dash switch module in accordance with one embodiment illustrating principles of the present invention.

With reference to FIG. 2, an exemplary methodology of the system shown in FIG. 1 for operating the operator interface device 12 and providing haptic feedback via the haptic feedback device 14 (and the trailer haptic feedback device 36) and visual feedback via the visual feedback device 16 (and trailer visual feedback device 40) is illustrated. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

With reference to FIGS. 1 and 2, a status of the vehicle brake system 20 is determined in a step 110. If no faults are detected in the step 110, the vehicle operator activates the operator interface device 12 and/or the trailer operator interface device 34 in a step 112 for executing an intended action. The intended action may be to change a state of the parking brake system. Activation of the operator interface device 12 and/or the trailer operator interface device 34 is discussed above in more detail.

The ECU 32 transmits a signal to achieve the operators intended action in a step 114. For example, in the step 114, the ECU 32 transmits a signal to engage the vehicle park brakes 26 if the vehicle operator's intended action is to engage the park brakes 26. Alternatively, in the step 114, the ECU 32 transmits a signal to disengage the vehicle park brakes 26 if the vehicle operator's intended action is to disengage the park brakes 26.

A determination is made by the ECU 32, for example, in a step 116, whether the intended action is achieved.

If it is determined in the step 116 that the vehicle operator's intended action is achieved (e.g., a "good" result is achieved), the vehicle park brakes 26 are either engaged or disengaged in a step 120. Then, in a step 122, the first haptic feedback and/or the first visual feedback is provided via at least one of the haptic feedback device 14, the trailer haptic feedback device 36, the visual feedback device 16, and the trailer visual feedback device 40. Control then returns to the step 110.

If, on the other hand, it is determined in the step 116 that the vehicle operator's intended action is not achieved (e.g., a "bad" result), the second haptic feedback and/or the second visual feedback is provided, in a step 124, via at least one of the haptic feedback device 14, the trailer haptic feedback device 36, the visual feedback device 16, and the trailer visual feedback device 40. Control then returns to the step 110.

If a fault is determined in the step 110, feedback is provided to the vehicle operator in a step 126. For example, the second haptic feedback and/or the second visual feedback is provided is provided via the haptic feedback device 14, the trailer haptic feedback device 36, the visual feedback device 16, and the trailer visual feedback device 40. As discussed above, different profiles may be used for providing the second feedback if a fault is detected in the step 110, as opposed to the second feedback provided in the step 124 if the vehicle operator's intended action is not achieved. Control then returns to the step 110.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

The invention claimed is:

1. A dash switch module, comprising:
   an operator interface device;
   a haptic feedback device associated with the operator interface device providing a first haptic feedback via the operator interface device if an operator's intended action is achieved and providing a second haptic feedback via the operator interface device if the operator's intended action is not achieved, the haptic feedback device also providing the second haptic feedback if a diagnostic trouble code is identified in an associated brake system electronic control unit; and
   a visual feedback device associated with the operator interface device providing a first visual feedback via the operator interface device if the operator's intended action is achieved and providing a second visual feedback via the operator interface device if the operator's intended action is not achieved, the visual feedback device providing the second visual feedback if the diagnostic trouble code is identified in the associated brake system electronic control unit.

2. The dash switch module as set forth in claim 1, wherein: the operator interface device is a switch.

3. The dash switch module as set forth in claim 1, wherein: the operator interface device is a button.

4. The dash switch module as set forth in claim 1, wherein: the operator activates the operator interface device when the intended action is a change of a state of parking brakes of an associated vehicle.

5. The dash switch module as set forth in claim 4, wherein if the state of the parking brakes is successfully changed:
   the haptic feedback device provides the first haptic feedback; and
   the visual feedback device associated with the operator interface device provides the first visual feedback.

6. The dash switch module as set forth in claim 1, wherein:
   the first haptic feedback is a vibration of the operator interface device; and
   the first visual feedback is a light associated with the operator interface device.

7. The dash switch module as set forth in claim 6, wherein:
   the first haptic feedback causes the vibration of the operator interface device to persist for a first haptic predetermined time period; and
   the first visual feedback causes the light associated with the operator interface device to one of illuminate and blink for a first visual predetermined time period.

8. The dash switch module as set forth in claim 1, wherein:
   the first haptic feedback is a vibration of the operator interface device according to a first haptic pattern;
   the second haptic feedback is a vibration of the operator interface device according to a second haptic pattern;

the first visual feedback is a light associated with the operator interface device that is illuminated according to a first visual pattern; and
the second visual feedback is the light associated with the operator interface device that is illuminated according to a second visual pattern.

9. The dash switch module as set forth in claim 8, wherein:
the first haptic pattern is a continuous vibration for a first predetermined time;
the second haptic pattern is an alternate vibration for the first predetermined time;
the first visual pattern is a continuous light for the first predetermined time; and
the second visual pattern is a blinking light for the first predetermined time.

10. The dash switch module as set forth in claim 9, wherein:
the first predetermined time begins when the operator activates the operator interface device to change a state of an associated vehicle; and
the first predetermined time ends a second predetermined time after at least one of the operator's intended action is achieved and the operator no longer activates the operator interface device.

11. The dash switch module as set forth in claim 10, wherein:
the second predetermined time is between about zero (0) seconds and about five (5) seconds after at least one of the operator's intended action is achieved and the operator no longer activates the operator interface device.

12. The dash switch module as set forth in claim 1, further including:
a trailer operator interface device, the operator interface device being associated with tractor parking brakes, and the trailer operator interface device being associated with trailer parking brakes;
a trailer haptic feedback device associated with the operator interface device providing a trailer haptic feedback if an operator's intended action is achieved via the trailer operator interface device; and
a trailer visual feedback device associated with the trailer operator interface device providing a first trailer visual feedback if the operator's intended action is achieved via the trailer operator interface device.

13. A dash switch module, comprising:
an operator interface device;
means for providing a first haptic feedback via the operator interface device if an operator's intended action is achieved and providing a second haptic feedback via the operator interface device if the operator's intended action is not achieved, the second haptic feedback being provided if a diagnostic trouble code is identified in an associated brake system; and
means for providing a first visual feedback via the operator interface device if the operator's intended action is achieved and providing a second visual feedback if the operator's intended action is not achieved, the second visual feedback being provided if the diagnostic trouble code is identified in the associated brake system.

14. The dash switch module as set forth in claim 13, wherein:
the first haptic feedback is a first vibration pattern associated with the operator interface device;
the second haptic feedback is one of a second vibration pattern and no vibration associated with the operator interface device;

the first visual feedback is a first lighting pattern associated with the operator interface device; and
the second visual feedback is one of a second lighting pattern and no lighting pattern associated with the operator interface device.

15. The dash switch module as set forth in claim 14, wherein:
the first vibration pattern is a continuous vibration for a first predetermined time;
the second vibration pattern is an alternate vibration for the first predetermined time;
the first lighting pattern is a continuous light for the first predetermined time; and
the second lighting pattern is a blinking light for the first predetermined time.

16. The dash switch module as set forth in claim 15, wherein:
the first predetermined time begins when the operator activates the operator interface device to change a state of an associated vehicle; and
the first predetermined time ends a second predetermined time after at least one of the operator's intended action is achieved and the operator no longer activates the operator interface device.

17. A dash operator interface device activated to change a state of a vehicle park brake, the dash operator interface device comprising:
a haptic feedback device providing a first haptic feedback via the operator interface device if an operator's intended action to change the state of the vehicle brake is achieved and providing a second haptic feedback if the operator's intended action to change the state of the vehicle brake is not achieved within a predetermined minimum activation period of time; and
a visual feedback device providing a first visual feedback via the operator interface device if the operator's intended action to change the state of the vehicle brake is achieved and providing a second visual feedback if the operator's intended action to change the state of the vehicle brake is not achieved within the predetermined minimum activation period of time.

18. The dash operator interface device as set forth in claim 17, wherein:
the first haptic feedback is a vibration while the dash operator interface device is activated and that continues for a continued predetermined time period after the dash operator interface device is not activated; and
the first visual feedback is a light that one of illuminates and blinks while the dash operator interface device is activated and that continues for the continued predetermined time period after the dash operator interface device is not activated.

19. The dash operator interface device as set forth in claim 17, wherein:
the haptic feedback device receives a control signal from an associated vehicle electronic control unit based on whether the operator's intended action is achieved, the control signal controlling whether the haptic feedback device provides one of the first haptic feedback and the second haptic feedback;
the visual feedback device receives the control signal from the associated vehicle electronic control unit based on whether the operator's intended action is achieved, the control signal controlling whether the visual feedback device provides one of the first visual feedback and the second visual feedback.

20. A method of providing feedback to a vehicle operator regarding a vehicle braking system, the method comprising:
   determining a status of the vehicle braking system;
   receiving an operator's intended action for changing the status of the vehicle braking system;
   providing a first haptic feedback if the operator's intended action is achieved;
   providing a first visual feedback if the operator's intended action is achieved; and
   if the status of the vehicle includes a fault:
      providing a second haptic feedback; and
      providing a second visual feedback.

21. The method of providing feedback to a vehicle operator as set forth in claim 20, further including:
   providing the second haptic feedback if the operator's intended action is not achieved; and
   providing the second visual feedback if the operator's intended action is not achieved.

22. The method of providing feedback to a vehicle operator as set forth in claim 21, further including:
   providing the first haptic feedback as a vibration according to a first vibration pattern;
   providing the first visual feedback as a light according to a first visual pattern;
   providing the second haptic feedback as a vibration according to a second vibration pattern; and
   providing the second visual feedback as a light according to a second visual pattern.

23. The method of providing feedback to a vehicle operator as set forth in claim 22, further including:
   providing the first vibration pattern as a continuous vibration;
   providing the second vibration pattern as an alternate vibration;
   providing the first visual pattern as a continuous light; and
   providing the second visual pattern as one of a blinking light and no light.

24. The method of providing feedback to a vehicle operator as set forth in claim 23, wherein:
   the step of providing the first vibration pattern as a continuous vibration includes:
      providing the continuous vibration when the operator activates the operator interface device to change a state of an associated vehicle; and
      providing the continuous vibration until a second predetermined time after at least one of the operator's intended action is achieved and the operator no longer activates the operator interface device; and
   the step of providing the first visual pattern as a continuous light includes:
      providing the continuous light when the operator activates the operator interface device to change a state of an associated vehicle; and
      providing the continuous light until the second predetermined time after at least one of the operator's intended action is achieved and the operator no longer activates the operator interface device.

* * * * *